May 31, 1966     E. V. PAINTER ET AL     3,253,715
PROCESS AND COMPOSITION FOR BOIL PROOF NON-WOVEN FILTER MEDIA
Original Filed June 11, 1959
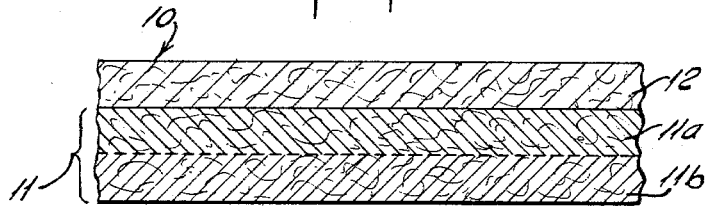
Through bonded by Polyvinyl Alcohol and Polyacrylic Acid reacted in situ
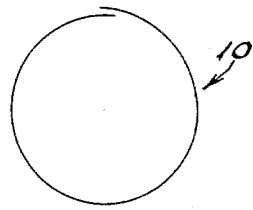
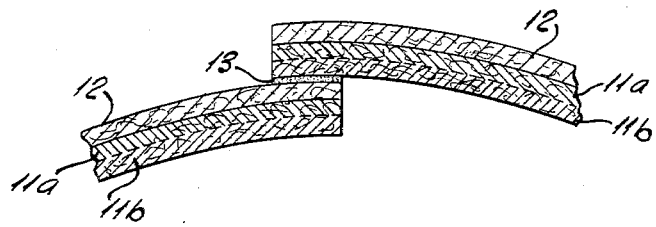

3,253,715
PROCESS AND COMPOSITION FOR BOIL PROOF NON-WOVEN FILTER MEDIA
Erle V. Painter, La Grange, and William R. Strickel, Chicago, Ill., George L. Weir, Swarthmore, Pa., and Fred K. Mesek and Felice C. Palermo, Downers Grove, and Robert C. Shepherd, Oak Lawn, Ill., assignors to Johnson & Johnson, New Brunswick, N.J., a corporation of New Jersey
Continuation of application Ser. No. 819,757, June 11, 1959. This application Feb. 6, 1963, Ser. No. 265,300
12 Claims. (Cl. 210—504)

This application is a continuation of application S.N. 819,757 filed June 11, 1959, now abandoned.

This invention relates to filter media, and more particularly to such media which is through-bonded by an agent which is prepared by reaction in situ, and thereby rendered boilproof. The bonding agent is a reaction product of polyvinyl alcohol and a polycarboxylic acid, preferably a polyacrylic acid or a cross-linked polyacrylic acid.

Various filter media have been used heretofore for the separation of solid material from fluid material, e.g., for the filtration of milk. In present-day practice wherein a so-called parlor milking system is used, the milk from a number of cows is delivered to a refrigerated holding tank through a pipeline system, and it is desirable to filter the milk from each cow before it is delivered into the main pipeline. The filters for this purpose are called in-a-line filters. In such a system, the filter material must withstand considerable direct pressure differentials as well as sudden surges of reverse pressures. In addition, it must be able to withstand boiling temperatures in instances where the milking system is sanitized by very hot aqueous solutions. The art is confronted by the problem of providing economical and efficient filter media having these desirable strength properties, and also adequate filtration efficiency. In addition, the art is confronted by the problem of providing a filtration media having a white surface on which large dirt particles may be quickly or readily observed, e.g., through a transparent filter holder or unit.

The discoveries associated with the invention and relating to solution of the above problems, and the objects achieved in accordance with the invention as set forth herein include: the provision of boil-proof non-woven filter media composed of cellulosic fibers bonded by the reaction product of polyvinyl alcohol and a polycarboxylic acid of at least 90,000 molecular weight in situ, the percentage of binder on a dry solids basis being in the range of 1.25 to 10.6, said fabric having a minimum tensile strength after immersion in boiling water for 20 minutes of at least 0.2 lb./in., the proportion of the alcohol being in the range of 1 to 3 parts per part by weight of the polycarboxylic acid; the provision of such material having omni-directional strength and a boiled test strength of at least 1.0 lb./in. width the provision of such material having graded porosity, that is, the reaction product bonds the fibers together leaving pores therebetween of graded size; the provision of such material having a relatively coarse incoming filtering layer followed by a relatively fine filter layer, said incoming layer being relatively smooth and white so as to provide an inspection surface; the provision of such material wherein the incoming layer is carded crimped rayon of 3 to 8 denier having 6 to 15 crimps per inch, the provision of such material wherein the incoming layer is followed by a graded pore zone of the following composition:

20 parts by weight of crimped rayon of about 1.6 inch staple length and about 5.5 denier (15.5 micrograms per inch actual fiber length) diameter, each fiber of which contains 6 to 15 crimps per inch (crimped basis) each crimp having an amplitude (height from mean) of about 1/32 inch and a wave length of 1/15 to 1/8 inch;
45 parts by weight of similar crimped rayon of a fineness of 8.5 micrograms per inch;
20 parts by weight of similar crimped rayon of a fineness of about 4.25 micrograms per inch;
15 parts by weight of cotton having a fineness of about 3 to 6 micrograms per inch (9.9 to 14 microns diameter average) and an average classer staple length of about 0.8 inch; and
20 parts by weight (based on the weight of the above mixture) of bleach absorbent cotton or rayon threads 0.5 to 3 inches in length, and having a cotton count of 40;

the provision of such material being in the shape of a tube formed by rolling and partially overlapping a sheet, said overlap being bonded by a boil-proof polyethenyl adhesive; the provision of a method of making boil-proof filter media having omni-directional strength and graded porosity which method comprises moving a web of a mixture having the following composition:

20 parts by weight of crimped rayon of about 1.6 inch staple length and about 5.5 denier (15.5 micrograms per inch actual fiber length) diameter, each fiber of which contains 6 to 15 crimps per inch (crimped basis) each crimp having an amplitude (height from mean) of about 1/32 inch and a wave length of 1/15 to 1/8 inch;
45 parts by weight of similar crimped rayon of a fineness of 8.5 micrograms per inch;
20 parts by weight of similar crimped rayon of a fineness of about 4.25 micrograms per inch;
15 parts by weight of cotton having a fineness of about 3 to 6 micrograms per inch (9.9 to 14 microns diameter average) and an average classer staple length of about 0.8 inch; and.
20 parts by weight (based on the weight of the above mixture) of bleached absorbent cotton or rayon threads 0.5 to 3 inches in length, and having a cotton count of 40;

into a flowing air stream substantially uniformly across its width, and stopping the movement of the fibers by a foraminous barrier while continuing the movement of the air, so as to place the heavier fibers at the bottom and the remaining fibers in successive zone thereon according to their fineness, said fibers being arranged at random in a web transverse to the predominant direction of the air flow, separating the resulting web from the air stream, impregnating said web with an aqueous solution containing polyvinyl alcohol and a polyacrylic acid and having a pH in the range of about 3.0 to 5.0, the wet pick-up of the solution being in the range of 200 to 300% and placing it in an oven at 250 to 400° F. for 2 to 4 minutes; the provision of a method wherein prior to the impregnation there is placed upon the random directional web a layer of crimped rayon of 3 to 8 denier and 6 to 15 crimps per inch, the weight of the said superimposed layer being about 200 to 800 grains per square yard and the weight of the random directional layer being about 600 to 1200 grains per square yard; the provision of a method wherein the added layer is of 3.0 denier rayon having 9 to 12 crimps per inch, said layer weighing 400 grains/sq. yd.; the provision of a method wherein the weight of the random directional layer is 900 grains/sq. yd., and other objects which will be apparent as details or embodiments of the invention are described hereinafter.

In connection with this disclosure, reference will be made to the accompanying drawing wherein FIG. 1 is a schematic cross-sectional view of a filter medium made in accordance with the invention. FIG. 2 is a schematic end view of such material rolled up to form a tube with an overlap seam, and FIG. 3 is a schematic enlarged cross-sectional view of the overlap of such a tube, showing an adhesive inter-layer. In more detail, in these figures, 10 indicates the media generally, 11 indicates a bottom layer made up of coarser zone 11b and a finer zone 11a, and 12 indicates a carded or isotropic layer which is coarser than zone 11a, and 13 indicates a heat-sealable adhesive such as polyethylene. In order to facilitate a clear understanding of the invention, the following preferred specific embodiments are described in detail.

*Example 1a*

A composite filter sheet is made up in the following manner.

A mixture or carded web of the following composition is used in the first step:

20 parts by weight of crimped rayon of about 1.6 inch staple length and about 5.5 denier (15.5 micrograms per inch actual fiber length) diameter, each fiber of which contains 6 to 15 crimps per inch (crimped basis) each crimp having an amplitude (height from mean) of about 1/32 inch and a wave length of 1/15 to 1/6 inch;

45 parts by weight of similar crimped rayon of a fineness of 8.5 micrograms per inch;

20 parts by weight of similar crimped rayon of a fineness of about 4.25 micrograms per inch;

15 parts by weight of cotton having a fineness of about 3 to 6 micrograms per inch (9.9 to 14 microns diameter average) and an average classer staple length of about 0.8 inch; and 20 parts by weight (based on the weight of the above mixture) of bleached absorbent cotton or rayon threads 0.5 to 3 inches in length, and having a cotton count of 40 which cotton count is defined as the number of yards in one pound of the thread divided by 840.

The card or web of this mixture is moved into a flowing air stream, individual fibers or strings thereof being suspended in this stream substantially uniformly across its width, and then the movement of the fibers is stopped by a foraminous barrier while continuing the movement of the air, so as to place the fibers at random in a web arranged transverse to the predominant direction of the air flow, and the resulting web having substantially equal strength lengthwise and crosswise is separated from the air stream. Suitable apparatus for this operation is described in U.S. Patents 2,676,363 and 2,676,364.

In this operation, the card web is fed into the apparatus. The card web is broken up by the lickerin which rotates in the direction to drive the fragments or fibers in a downwardly direction. The fibers or fragments are carried by the air flow to the foraminous barrier which is in the form of a cylinder rotating so that the surface contacted by the fibers is moving in an upwardly direction. The heavier or larger fibers or fragments tend to go into the lower region or zone of the moving air stream, and thus are the first to be deposited on the foraminous barrier. The less coarse or heavy fibers remain in a zone which is above the above-mentioned zone and thus are deposited just above the above-mentioned layer. In this way, there is built up a composite on the foraminous barrier having a gradient of fiber thickness, or alternatively, of porosity.

There is superimposed upon the above-described web a carded web of 3.0 denier crimped rayon of the above-described type. In one modification, the upper carded web weighs 400 grains per square yard and the lower web weighs 900 grains per square yard.

A bath is prepared containing 1.18% by weight of polyvinyl alcohol (Elvanol 72–60, i.e., high viscosity, substantially 100% hydrolyzed) and 1.18% of cross-linked polyacrylic acid (prepared from acrylic acid monomer, a small proportion of allyl sucrose, potassium persulfate catalyst and water in accordance with Example 2 of U.S. Patent 2,798,053; or Carbopol 934 polycarboxylic acid) in water. The pH of the bath is adjusted to about 3.3 by adding phosphoric acid (e.g. 0.0121% of 85% strength phosphoric acid). The above-described composite sheet is passed through the bath at about 110° F. and squeezed to remove excess solution and leave a pick-up of 250% of the solution based on fabric weight. The resulting impregnated sheet material is dried for 210 seconds in an oven at 300° F.

The composite web is passed in a continuous manner through a bonding unit and then through a drier. The drying or setting is at a temperature of about 250 to 400° F.

Samples prepared in accordance with this procedure, when submerged in boiling water for 20 minutes, give wet tensile strength tests of 4.0 lbs./in. width in the major fiber direction (i.e., for a carded material) and 1.7 lbs./in. in the cross direction, for a material weighing 3.0 oz./yd$^2$.

A sample made in accordance with the above procedure, when soaked for ½ hour in boiling 10% caustic shows no visible degradation or swelling. Similar samples soaked in 10% hydrochloric acid at room temperature for ½ hour also show no visible degradation or swelling.

These results are indeed surprising, especially in view of test experience with viscose bonded fabrics which lack the desired porosity. Fabrics of the above type have a low load density range of 0.060–0.150 gram/cc., whereas if viscose bonded, they have a low load density range of 0.19–0.28 gram/cc. which is too compact for adequate filtration. Fabrics with boil-proof properties produced with certain latices such as the vinyls and acrylics contain extractable surface active agents which would exclude their use in a milk filter. Similarly, such fabrics produced from formaldehyde containing resins contain extractable material; and, they lack the acid and alkali resistance of the products of the present invention.

Any desired type of polyvinyl alcohol of any convenient viscosity such as 15 to 75 centipoises (preferably 28 to 65 centipoises in 4% solution at 20° C.) may be employed in the practice of this invention. Polyvinyl alcohol is generally produced by hydrolysis of polyvinyl acetate and either completely hydrolyzed or partly hydrolyzed products may be used.

*Example 1b*

The above-described product may be used in any one of various forms. In one form it is cut into disks, e.g., 4 9/16" in diameter, and used in an in-a-line filter in a parlor milking system. It gives desirable filtration and has sufficient strength to withstand both the direct flow and also the occasional reverse flow pressures. In addition, any large dirt particles present are readily observable on the white inspection surface (which is the incoming surface).

*Example 1c*

In another modification, the above-described product may be cut into sheets, e.g., 6 3/8" x 6 3/8", rolled up into a tube with double overlap at the seam, inserted in a tube holder and used in an in-a-line filter in a parlor milking system. It gives desirable filtration and has sufficient strength to withstand both the direct flow and also the occasional reverse flow pressure. Any large dirt particles present are readily observable on the white inspection surface (which is the incoming surface).

*Example 1d*

In another modification, the above-described product may be cut into sheets, e.g., 6 3/8" by about 5 1/8" and rolled up into a tube with about a ½" overlap, adhered at the overlap by insertion of a sheet of high density polyethylene, the overlap being heat-sealed at sufficient temperature to melt or soften the adhesive polyethylene, without scorching or otherwise harming the bonded fabric, e.g., at a temperature of 375° F. It gives desirable filtration and has sufficient strength to withstand both the direct flow and also the occasional reverse flow pressures. Any large particles present are readily observable on the white inspection surface (which is the incoming surface).

Example 2

The above example is repeated except that the carded web is of 5.5 denier rayon and the bath contains 1.26% of the alcohol, 0.63% of the polyacrylic acid and 0.0289% of phosphoric acid (of 75% strength). Similar results are obtained.

Example 3

The above procedure is repeated except that the bath consists of 2.36% of the polyvinyl alcohol, 0.79% of the polyacrylic acid and 0.0242% of phosphoric acid (75% strength), and the solution pick-up is about 250%. Similar results are obtained.

Example 4

The above procedure is repeated except that the fabric is a carded layer of 100% of the 5.5 denier rayon which sheet weighs 740 grains per square yard, and is faced on both sides with 20 x 12 gauze. The impregnating bath consists of 2.36% of the polyvinyl alcohol, 0.79% of the polyacrylic acid and 0.024% of the phosphoric acid (75% strength), and the pick-up of impregnating solution is 250%.

The gauze facings are removed and the remaining material is soaked in boiling water for 20 minutes and when tested for strength shows 1.94 pounds per inch of width in the major fiber direction and 0.22 pound per inch of width in the cross direction.

Example 5

The above procedure is repeated except that the fibrous material is carded 100% coarse American cotton and it weighs 1400 grains per square yard. The bath consists of 1.26% of the polyvinyl alcohol, 0.63% polyacrylic acid and 0.0254% phosphoric acid (85% strength). Upon soaking in boiling water for 20 minutes, the product shows a strength in the major fiber direction of 6.75 pounds per inch and in the cross direction of 0.68 pound per inch.

Example 6

The above procedure is repeated except that the fabric consists of 100% of bleached absorbent coarse American cotton of about ⅞" staple length, and fiber fineness of 4.5–6.0 micrograms per inch (micronaire). The impregnating bath consists of 1.26% of the polyvinyl alcohol, 0.63% of the polyacrylic acid and 0.0254% of phosphoric acid (85% strength), and the pick-up of the impregnating solution is 402%. This sample represents a dense material with small pore size. (See Table I below for properties.)

Example 7

The above procedure is repeated except that the fabric consists of 100% of the fiber as used in the first step of Example 1a. The impregnating solution is the same as that of Example 6 and the pick-up of the impregnating solution is about 235%. (See Table I below for properties.)

TABLE I

| Sample Identification | Ex. 6 | Ex. 7 | Range |
|---|---|---|---|
| Finished Weight, grains/sq. yd | 1,334 | 980 | 150–1740 |
| Low Load Thickness, inches | 0.033 | 0.033 | 0.003–0.088 |
| Low Load Density, gm./cc | 0.123 | 0.091 | 0.060–0.150 |
| Air Resistance, inches of Water at 116 ft./min | 0.28 | 0.15 | 0.023–0.50 |
| Gurley Stiffness, mg.: | | | |
| Major Fiber Direction | 2,120 | 1,000 | |
| Cross Direction | 330 | 160 | |
| Maximum Pore Diameter at: | | | |
| .053 p.s.i | 146 | 209 | |
| 15 p.s.i | 118 | 196 | 91–246 |
| 30 p.s.i | 109 | 171 | 85–226 |
| Wash Resistance, gal./min | 4.7 | 5.25 | At least 2.0 |
| Fiber Fineness, micrograms/in. (Micronaire) | 4.8 | 6.3 | 4.7–8.7 |

Thickness (from which density is calculated) is measured under a "Low Load" compacting force of 0.16 p.s.i. Air resistance is measured in inches of water pressure drop across the sample at an air flow rate of 116 cu. ft./min. per sq. ft. of area (116 ft./min. "face velocity"), on the Schieffer-Fraser air resistance tester. The Gurley stiffness measures sheet flexibility on an instrument described in Bulletin No. 1400, by W. & L. E. Gurley, Troy, N.Y., copyright 1954. The maximum pore diameter is measured by the bubble point technique (Lord and Taylor, J. Text. Inst., vol. 45, No. 5 (May 1954) p. T371), while the sample is held under a compacting force of 0.053 p.s.i, 15 p.s.i. and 30 p.s.i. The wash resistance is measured in terms of the gal./min. flow rate of a stream of water from a ¼" diameter tube 2 inches away from the sample which is just able to rupture the sample.

Example 8

The above procedure is repeated except that the fabric is a carded layer of 100% of the 3.0 denier rayon web which sheet weighs 1000 grains per square yard. The impregnating bath consists of 0.465% of the polyvinyl alcohol, 0.232% of the polyacrylic acid and 0.245% glycerine and the pick-up of impregnating solution is 275%.

After soaking in water for 20 minutes at 95° F., the average wash resistance is 5.1 gal./min.

Example 9

The above procedure is repeated except that it consists of 100% of the fiber of Example 1 first step. The impregnating solution is 1.0% polyvinyl alcohol, 3.8% polyvinyl acetate, and 0.65% polyacrylic acid and the pick-up of the impregnating solution is about 235%.

After soaking in boiling water for 20 minutes, the tensile strength in the major fiber direction is 4.6 lbs./in., and in the cross direction it is 1.3 lbs./in.

Comparable results to the foregoing may be achieved with various modifications thereof including the following. The fibers should be at least 1 mm. in length and preferably of a convenient length to be handled by conventional machines, which give an isotropic or random arrangement of the fibers. Also, the longer fibers tend to give products having better wet-strength. Of the natural cellulosic materials, the wood pulp fibers may be in the range of about 1 to 5 mm. in length, and the usual textile fibers may be in the range of about 1 to 5 cm. or more in length. There is no fixed upper limit for the fiber length, except, of course, the size can be handled on the carding or other machine, or the size of the finished material.

The fiber fineness is conveniently expressed in terms of micrograms per linear inch, as known in the art (as determined by weighing measured lengths of fibers or by using known instruments, e.g., a commercially available instrument) the actual equivalent average diameter may be determined from this value and the density of the fiber.

Cellulosic materials are economically available in abundant supply, and are preferred for economic reasons, e.g., cotton, viscose rayon, acetate rayon, and bleached wood pulp fibers. The fiber fineness weight of the materials in the top layer may be in the range of 2.8 to 28 micrograms per inch for the crimped material on the basis of the density of cellulose and 2.8 to 28 micrograms per inch for the other fibers on such a basis; and the fibers in the upper part of the bottom layer may have a fineness weight in the range of 2.8 to 6 micrograms per inch on such a basis.

The crimps in the fibers may be rough or irregular or regular in a roughly 2-dimensional zone or in a 3-dimensional zone. The wave lengths and amplitudes thereof each may be in the range of about 0.01 to 0.22 inch. The crimped fibers should have at least three crimps or wave-loops, and this will determine the minimum length thereof.

The weight of the omni-directional strength layer may be in the range of 600 to 1200 grains/sq. yd. and the weight of the top layer of carded, crimped rayon may be in the range of 200 to 800 grains/sq. yd. The top or incoming layer may also have omni-directional strength instead of being carded.

The polycarboxylic acid may be a polymer of acrylic acid (which may be obtained by polymerizing acrylic acid or by polymerizing its ester with a lower alcohol, followed by hydrolysis or alcoholysis) or by polymerizing acrylonitrile followed by hydrolysis; or alternatively, it may be a copolymer or a cross-linked polymer such as divinyl compound copolymerized with an acrylic material. The molecular weight thereof must be at least 90,000 (Staudinger) and may be up to about 4,000,000.

If lower molecular weight polycarboxylic acid is used the resulting product is objectionable because of water extractable material. Higher molecular weight polycarboxylic acid is objectionable due to higher solution viscosity which is more difficult to handle and results in loss of desired porosity characteristics in the non-woven fabric.

The impregnating bath may contain other ingredients than the polyvinyl alcohol and the polyacrylic acid, such as corn starch, polyvinyl acetate, glycerine, hydroxyethylcellulose.

The pH of the impregnating bath may be adjusted so that it is in the range of 3.0 to 5.0. The pH may be adjusted if too high, by the addition of phosphoric acid, lactic acid, acetic, citric, glycollic, mineral acids and the like, or hydroxide or the like alkaline agent if too low.

The drying or setting temperatures for the impregnation may be in the range of 250 to 400° F., and the times may be in the range to 2 to 4 minutes.

The amount of binder in the non-woven fabric on a dry solids basis relative to the dry weight of the fabric alone may be in the range of 1.25 to 10.6%. Lower amounts do not provide boil-proof bonding. Higher amounts might be used, if the higher viscosity thereof is not objectionable, but they are not indicated for economic reasons.

The amount of the polyvinyl alcohol is in the range of 1 to 10 parts per part by weight of the polycarboxylic acid.

If too low a proportion of polyvinyl alcohol is used, the solution viscosity is undesirably high and sufficient solids concentration cannot be obtained to give a boil-proof fabric. If too high a proportion of polyvinyl alcohol is used, the final product does not have the desired boil-proof properties even at very high binder add-on.

The adhesive layer used in forming a tube or possibly a bag (tube with one end closed by a single adhesive seam or by double folding the end and interlining the folds with adhesive) may be polyethenyl, polyethylene, or polypropylene or blends thereof having a softening point above about 110° C. Another seam adhesive is polyvinyl acetate copolymer with small proportion of either dibutyl maleate or dibutyl fumarate, as well as a very small amount of acrylic ester if desired. Another seam adhesive is the alcohol polycarboxylic acid of Example 1, but with a thickener such as methyl cellulose in an amount to provide a viscosity of about 20,000 to 50,000 centipoise (as measured on a Brookfield viscometer, Model LVF with a No. 4 spindle at 6 r.p.m.).

Another seam adhesive is a polyvinyl chloride plastisol such as sold commercially under the name of Bakelite QYNV suspended in acetyltributyl citrate in the proportion range of 1.0 to 1.5 parts of polyvinyl chloride to 1 part of the citrate. The seam must be solidified with heat such that the plastisol reaches a temperature of 250 to 350° F., which then results in a boil-proof seam. Other polyvinyl chlorides or polyvinyl chloride/acetate copolymers and plasticizers having equivalent properties may be used.

The important problem solved for the dairy farmer is the provision of a smooth, white inspection surface in the filter to give a quick, easy determination of foreign substances in the milk. The white fiber on the surface of the filter media of the invention provides this white surface. The most surprising result of the invention is the provision of an adhesive binder for the non-woven fabric which does not discolor and yet provides the boil-proof feature. Many adhesives which can be used as boil-proof binders suffer from the discoloration problem, for instance, synthetic rubber latices such as butadiene copolymers, natural rubber, or phenol formaldehyde resins.

Instead of the blend of fibers set forth in Example 1, other blends of fibers in the fineness range of 2.0 to 25.0 micrograms per inch may be used. The proportions of different fineness fibers should be adjusted to given an average fibers fineness of 6.0 to 12.0 micrograms per inch.

In view of the foregoing disclosures, variations or modifications thereof will be apparent, and it is intended to include within the invention all such variations and modifications except as do not come within the scope of the appended claims.

We claim:

1. A boil-proof non-woven filter media adapted for the filtration of milk consisting essentially of cellulosic fibers disposed in a web to form a plurality of filtering pores between the fibers said fibers being interbonded by the reaction product of polyvinyl alcohol of 15–75 centipoises viscosity as determined on a 4% solution at 20° C. basis and a polyacrylic acid polymer of 90,000 to 4,000,000 molecular weight said reaction product being insoluble in boiling water and present in said filter media on a dry solid basis in an amount of at least 1.25 to 10.6 percent of the cellulosic fibers, said filter media having a minimum tensile strength after immersion in boiling water for 20 minutes of at least 0.2 lbs. per inch.

2. The boil-proof non-woven filter media of claim 1 wherein said fibers are arranged at random in said web whereby said web has omni-directional strength when exposed to boiling water.

3. The boil-proof non-woven filter media of claim 2 wherein said fibers are arranged with the coarser fibers arranged adjacent one surface of said web in a random manner and wherein the remaining fibers are arranged in successive zones according to their fineness to provide a media having graded porosity with the greatest porosity adjacent said one surface of said filter media.

4. The boil-proof non-woven filter media of claim 3 having a relatively coarse incoming filtering layer followed by a relatively fine filtering layer, said incoming layer being relatively smooth and white so as to provide an inspection surface.

5. The boil-proof non-woven filer media of claim 3 wherein a plurality of threads are disposed in a random manner adjacent said one surface of said web whereby additional omni-directional strength is imparted to said filter media.

6. The boil-proof non-woven filter media of claim 1 wherein a plurality of said fibers are arranged at random in said web, and a plurality of said fibers are in the form of a carded web superposed on the incoming surface of said random web whereby said web has substantial strength in all directions when exposed to boiling water and has a relatively smooth and white incoming surface to comprise an inspection surface.

7. The boil-proof non-woven filter media of claim 6 wherein said carded web comprises carded fibers of crimped rayon of 3 to 8 denier and having 6 to 15 crimps per inch.

8. A boil-proof non-woven filter formed in the shape of a tube of the filter media set forth in claim 7, the web being rolled with two generally parallel edge portions overlapping, the overlapping portions being bonded together with a thermoplastic material of the group consisting of polyethenyl, polyethylene and polypropylene, said material having a softening point above 110° C.

9. A non-woven filter media of claim 1 in which said fibers are randomly, disposed in said web whereby said web exhibits substantially the same tensile strength in all directions, the coarsest fibers being arranged adjacent one surface of said web in a random manner and the remaining fibers being arranged in successive zones according to their fineness to provide a media having graded porosity with the greatest porosity adjacent said one surface of said filter media.

10. The method of making boil-proof non-woven filter media particularly adapted for the filtering of milk comprising forming a porous web of cellulosic fibers, depositing on the fibers of said web polyvinyl alcohol of 15–75 centipoises viscosity as determined on a 4% solution at 20° C. basis and a polyacrylic acid polymer having a molecular weight of 90,000 to 4,000,000 said polyvinyl alcohol being present in an amount of 1 to 10 parts per weight polyvinyl alcohol for each part by weight of said polyacrylic acid polymer and reacting said polyacrylic acid polymer with said polyvinyl alcohol while deposited on said fibers by heating and drying at a temperature of about 250° to 400° F. to bond the same at their points of intersection in said web while maintaining the areas in said web between said points of intersection of said fibers open; the amount of reaction product of said polycarboxylic acid and said polyvinyl alcohol in said web being kept about 1.25% on a dry weight solids basis of the dry weight of the fibers forming said web by controlling the amount of polycarboxylic acid and polyvinyl alcohol deposited on said fibers, said polyacrylic acid polymer and polyvinyl alcohol being deposited on said cellulosic fibers in a water medium maintained at a pH of 3 to 5.

11. The method of claim 10 in which said polyacrylic acid polymer has a molecular weight in the range between about 90,000 and about 4,000,000, the percentage of binder on a dry solids basis is in the range of 1.25 and 10.6 percent of the fiber weight, and the proportion of the polyvinyl alcohol to polyacrylic acid polymer is in the range of 1 to 3 parts per part by weight of polyvinyl alcohol for each part by weight of the polycarboxylic acid.

12. The method of claim 11 wherein said fibers are randomly disposed in said web to provide substantially equal tensile strength in all directions in said web.

References Cited by the Examiner

UNITED STATES PATENTS

| | | | |
|---|---|---|---|
| 2,169,250 | 8/1939 | Izard | 260—91.3 |
| 2,211,689 | 8/1940 | Dittmar | 260—27 |
| 2,327,250 | 8/1943 | Cruickshank | 210—508 |
| 2,437,082 | 3/1948 | Davis et al. | 210—508 |
| 2,557,266 | 6/1951 | Dittmar et al. | 260—854 |
| 2,751,962 | 6/1956 | Drummond | 65—3 |
| 2,798,053 | 7/1957 | Brown | 252—89 |
| 2,801,673 | 8/1957 | Welsh | 161—72 |
| 2,834,730 | 5/1958 | Painter et al. | 210—504 |
| 2,971,907 | 2/1961 | Smith | 210—504 |

FOREIGN PATENTS 805,724 12/1958 Great Britain.

JULIUS GREENWALD, *Primary Examiner.*

M. WEINBLATT, *Assistant Examiner.*